(12) United States Patent
Falkner

(10) Patent No.: US 6,663,771 B1
(45) Date of Patent: Dec. 16, 2003

(54) LIQUID TREATMENT APPARATUS

(76) Inventor: Kemp E. Falkner, 427 Camelia Trail, St. Augustine, FL (US) 32086

( * ) Notice: Subject to any disclaimer, the term of this patent is extended or adjusted under 35 U.S.C. 154(b) by 205 days.

(21) Appl. No.: 09/933,608

(22) Filed: Aug. 22, 2001

(51) Int. Cl.[7] .................................................. B01D 21/00
(52) U.S. Cl. .................. 210/207; 210/232; 210/519
(58) Field of Search ................................. 210/205, 207, 210/232, 278, 286, 424, 519

(56) References Cited

U.S. PATENT DOCUMENTS

| | | | |
|---|---|---|---|
| 789,968 A | * 5/1905 | Ernst | 210/424 |
| 1,762,314 A | 6/1930 | Sutphen et al. | 210/197 |
| 3,347,785 A | * 10/1967 | Staats | 210/672 |
| 3,371,033 A | 2/1968 | Simmons et al. | |
| 4,038,186 A | * 7/1977 | Potter et al. | 210/92 |
| 4,179,375 A | 12/1979 | Smith | 210/197 |
| 4,235,718 A | * 11/1980 | Lopez | 210/191 |
| 4,490,251 A | * 12/1984 | Quintana et al. | 210/209 |
| 4,491,549 A | 1/1985 | Fischer et al. | 261/36 R |
| 4,652,382 A | 3/1987 | Edwards et al. | 210/752 |
| 4,735,716 A | 4/1988 | Petrucci et al. | 210/232 |
| 5,015,394 A | 5/1991 | McEllhenney | 210/744 |
| 5,147,530 A | 9/1992 | Chandler et al. | 210/90 |
| 5,286,389 A | 2/1994 | Hardison | 210/712 |
| 5,456,830 A | 10/1995 | Stanford | 210/235 |
| 5,484,527 A | * 1/1996 | Janik et al. | 210/232 |
| 5,709,799 A | 1/1998 | Engelhard | 210/478 |
| 5,916,439 A | 6/1999 | Oleskow | 210/198.1 |
| 6,074,562 A | * 6/2000 | Falkner | 210/721 |
| 6,080,306 A | * 6/2000 | Falkner | 210/123 |
| 6,187,188 B1 | * 2/2001 | Janik et al. | 210/232 |
| 6,207,064 B1 | 3/2001 | Gargas | 210/752 |
| 6,221,245 B1 | 4/2001 | Colburn | 210/223 |

* cited by examiner

Primary Examiner—Frank M. Lawrence
(74) Attorney, Agent, or Firm—Charles M. Kaplan (57) ABSTRACT

A unitary liquid flow separator-collector-distributor controls the flow of liquid streams in liquid treatment tanks and treatment methods that can utilize the entire cross section of the vessels in which the treatment takes place.

23 Claims, 10 Drawing Sheets

LIQUID TREATMENT APPARATUS

BACKGROUND OF THE INVENTION

This invention relates to the treatment of liquids, and more particularly to methods and apparatus for controlling the flow of water in liquid treatment apparatus. Numerous or complicated parts and fittings have been required to control flow paths where multiple flow streams occur in the same liquid treatment vessel. Also, the full cross sectional area of cylindrical tanks has not been available for both the processing as well as the contact or detention of the liquid being treated.

OBJECTIVES OF THE INVENTION

Accordingly, it is an object of this invention to provide improved liquid treatment methods and apparatus.

Another object is to provide a unitary fitting that can segregate and control multiple liquid flow paths.

An additional object is to provide a liquid treatment vessel with a single integral or unitary separator for an influent stream, an effluent stream, and a stream of waste precipitated in the vessel.

Another object is to provide methods and flow separators that enable an given cylindrical tank configuration to be used efficiently as both a reaction process vessel and a contact or detention vessel.

Another object is to provide a methods of treating liquids in a cylindrical tank, without the use of solid treatment media, that achieves effective treatment over the entire cross sectional area of the tank.

A further object is to provide a liquid controller that separates influent and effluent streams flowing in opposite directions and that also traps sediment resulting from treatment of the liquid.

An additional object is to provide a liquid flow controller that enables more than one standard sized tank to be serially connected to ensure complete treatment of the liquid.

Another object is to provide effective removal of sulfur from potable water in tanks that can be be carried by one workman through standard doorways in a residential home.

Another object is to reduce the space required for multiple tank liquid treatment systems.

Another object is to provide water treatment equipment that can be assembled in a factory and shipped as one or more units of identical size to a home or business where the unit can be connected, or the units can be connected in series, to an existing water supply with standard plumbing tools.

A further object is to provide water treatment apparatus that is durable, economical, easy to use and repair and maintain, and which do not possess defects found in similar prior art apparatus.

Other objects and advantages of the flow separator, liquid treatment apparatus and methods incorporating this invention will be found in the specification and claims and the scope of the invention will be set forth in the claims.

DESCRIPTION OF THE INVENTION

Figure 1:
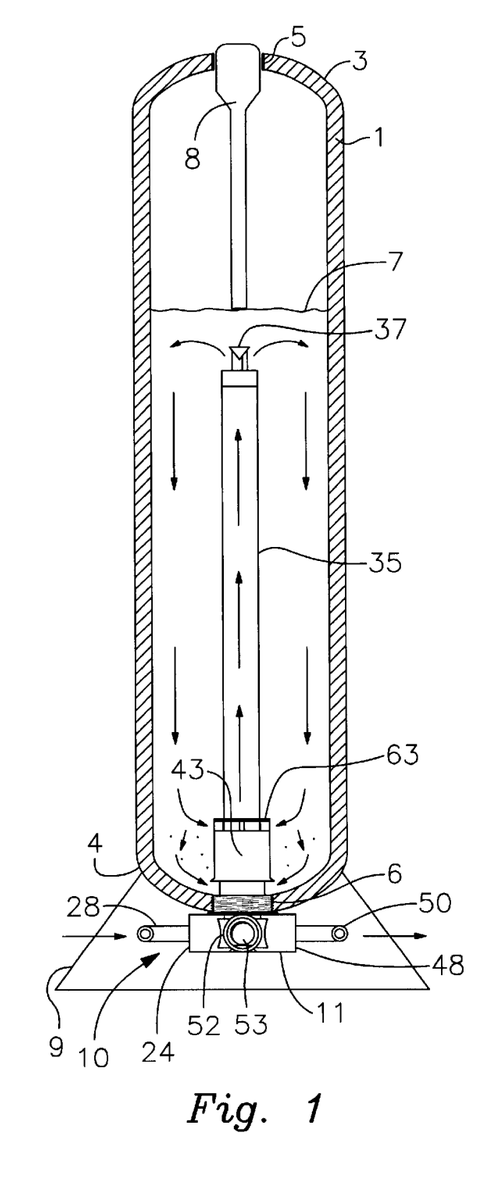
FIG. 1 is a schematic, partially cross sectional side view of an embodiment of liquid treatment apparatus in accord with this invention.

This invention may be used with the apparatus disclosed in my U.S. Pat. Nos. 6,074,562 and 6,080,306 to remove hydrogen sulfide from potable water by the methods disclosed in those patents. As shown in FIG. 1, the above identified methods may be carried out in a pressurized circular cylindrical fiberglass processing vessel or tank 1 that is devoid of solid liquid treatment media. Tank 1 has a domed top 3 a domed bottom 4. The height of tank 1 may be several times longer than the tank diameter (e.g. height 72 inches—diameter 24 inches). The top 3 has an upper threaded center hole 5 and the bottom 4 has a lower threaded center hole 6 that is coaxial with the hole 5 on the central axis of the tank 1. The level 7 of the liquid in tank 1, which should be above the mid-point of the tank height, may be controlled by float valve and venting devices 8 as described in my above identified US patents. The tank 1 may be supported on a stand 9.

The flow of liquid into and out of tank 1 and the flow of the liquid streams within tank 1 are controlled by an integral liquid flow separator 10 in accord with this invention. The separator 10 has a main body portion 11 that is located outside of and below the tank 1. Three concentric circular cylinders 14, 15 and 16 protrude upwardly and perpendicularly from the the center of body portion 11. The cylinders have different diameters and different lengths. The cylinder 14 with the greatest diameter has the shortest length, and the cylinder 16 with the smallest diameter has the greatest length. The cylinders are spaced apart so that an annular first liquid flow channel 17 is defined between the cylinders 14 and 15 and a second annular flow channel 18 is defined between the cylinders 15 and 16. The interior of cylinder 16 defines a third liquid flow channel 20.

Figure 3:
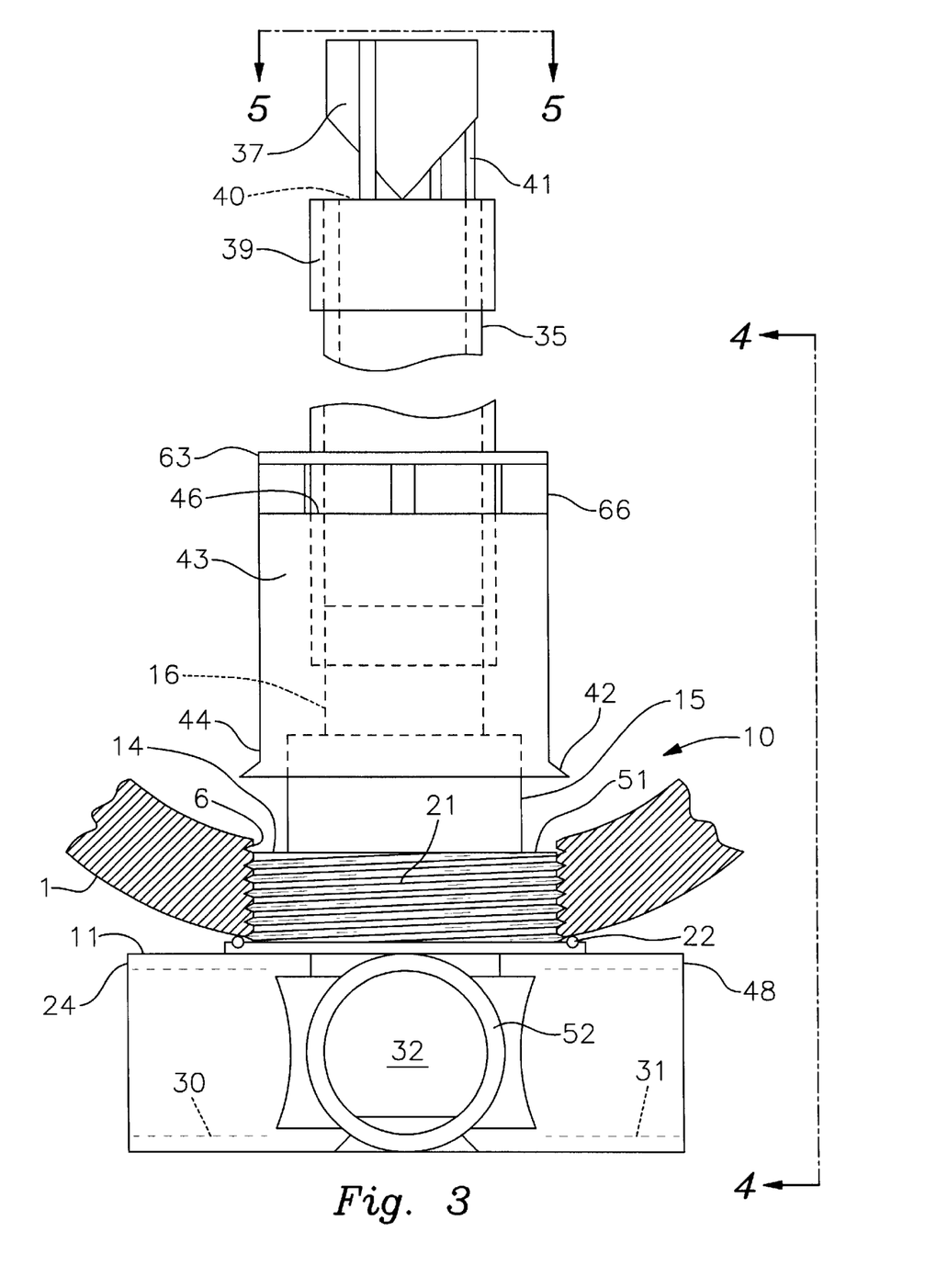
FIG. 3 is an enlarged partially cross sectional, partially broken away, side view of the flow controls from the embodiment of FIG. 1.
Figure 4:
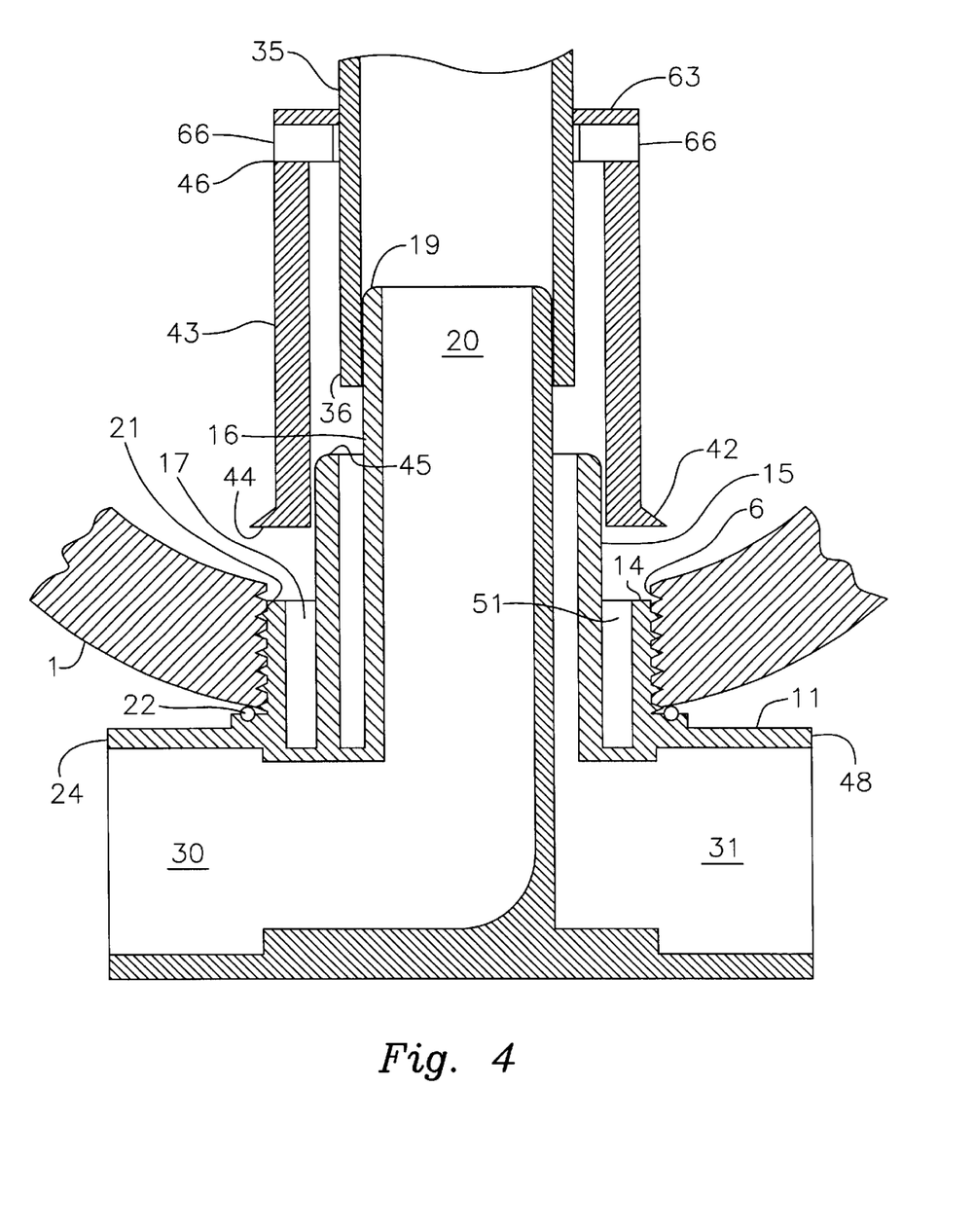
FIG. 4 is an enlarged cross sectional view taken generally along the line 4—4 in FIG. 3.
Figure 6:
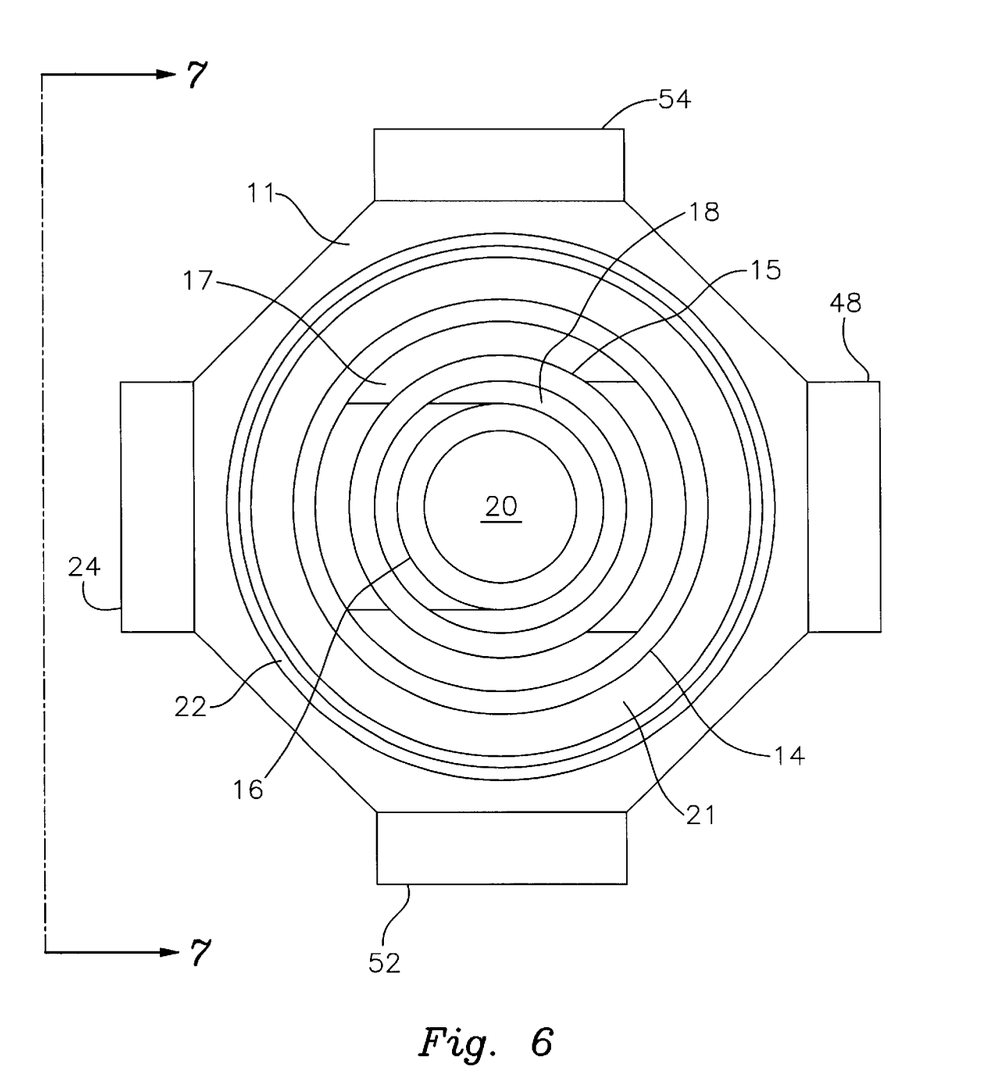
FIG. 6 is an enlarged top plan view of a separator in accord with this invention used in the embodiment of FIG. 1.
Figure 7:
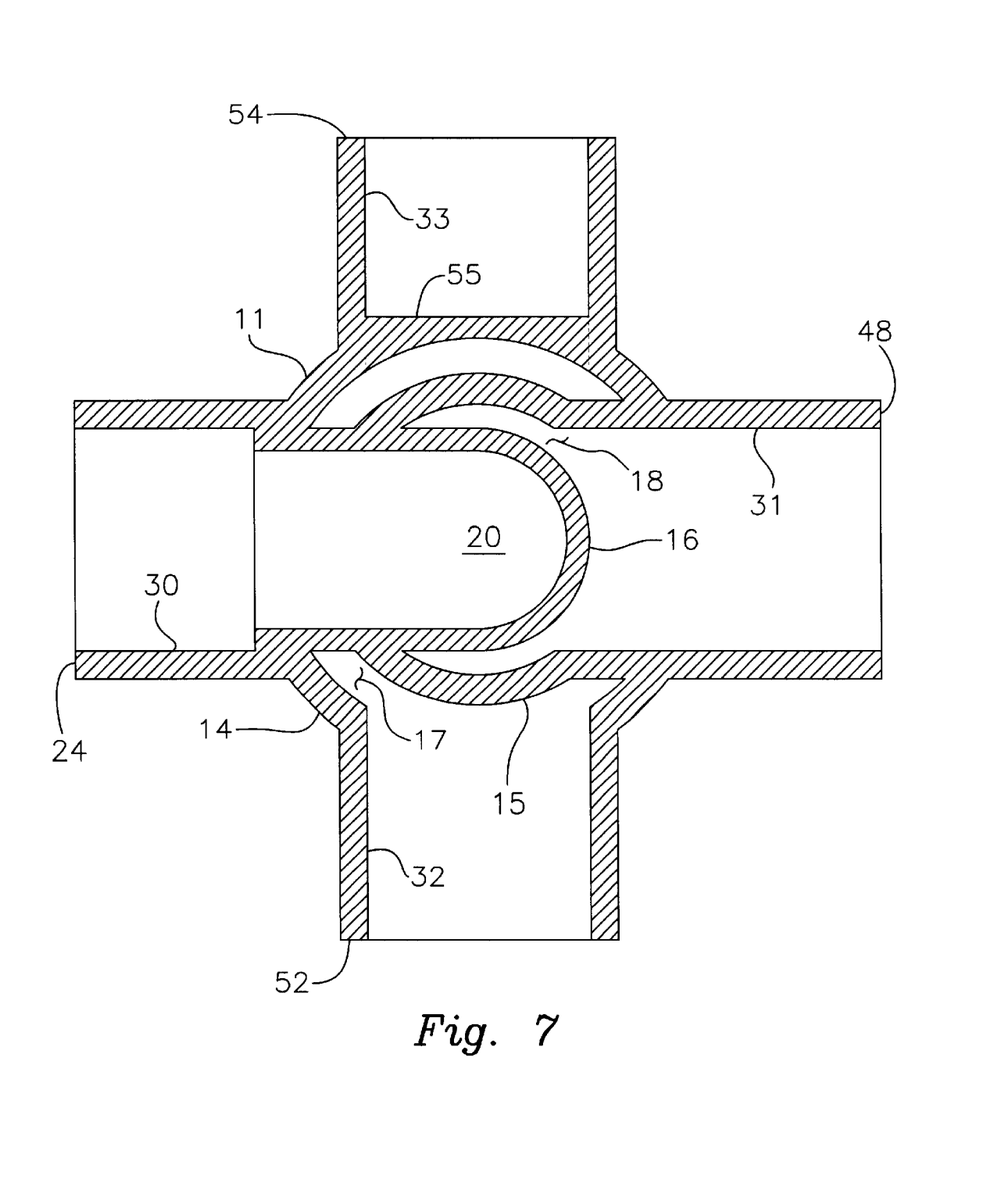
FIG. 7 is a cross sectional view taken generally along the line 7—7 in FIG. 6

The cylinder 15 with the largest diameter has external threads 21 for mating with the threads in the center hole 6 for attaching the the separator 10 to the bottom of tank 1. An O-ring gasket 22 in a groove around cylinder 14 provides a liquid tight seal between the separator and tank. The body portion 11 has four externally opening circular liquid flow ports 24, 48, 52 and 54 that can be connected to the inside of the cylinders 14–16 for flowing liquid into and out of the cylinders. The ports are located below the threads 21 for positioning the ports below and outside of the tank 1. Ports 24 and 48 are coaxial and ports 52 and 54 are coaxial, and the axes of the ports are perpendicular.

To carry out the methods disclosed in the above patents with a separator 10 connected to the tank 1 as shown in FIG. 1, potable water may be oxygenated [e.g. 6 ppm dissolved oxygen] and pressurized [e.g. above 55 psi] by apparatus components of the type disclosed in my above identified patents; such components and conventional inlet, outlet and waste valves have not been shown in the drawing because their details are not a part of this invention. The potable water from an influent pipe 28 enters through inlet port 24. The incoming untreated water flows through a circular duct 30 into the channel 20 inside of cylinder 16.

An upwardly extending cylindrical liquid distribution pipe 35 is attached at its lower end 36 to the upper end 19 of cylinder 16. The pipe 35 directs the incoming water stream upwardly through the center of tank 1 to near the upper liquid level 7. The incoming water is dispersed radially outwardly toward the periphery of the tank by an inverted conical deflector 37. The deflector 37 is attached to pipe 35 above the open terminal end of the pipe by an end cap 39 that has a center hole 40 that is coaxial with the interior of pipe 35. Struts 41 hold the deflector 37 suspended above and centered on the hole 40.

The water in tank 1 will be treated as it flows downwardly toward the bottom of the tank. When the methods disclosed in my above identified patents are carried out, sulfur particles will precipitate and fall downwardly with the downwardly flowing potable water. A cylindrical effluent collection pipe 43 has its lower end 44 connected to the upper end 45 of cylinder 15 and its open terminal end 46 extends upwardly from separator 10 so that end 46 is spaced above the bottom of tank 1. The descending treated water will enter end 46 and flow downwardly through pipe 43 into the channel 18 inside of cylinder 15. The channel 18 is connected by a circular duct 31 to an outlet port 48 where the treated water is available for its intended use through an effluent pipe 50.

Precipitated sulfur particles fall below the pipe end 46 and settle to the bottom of tank 1 where they collect in a sump 51 defined by the channel 17 inside of cylinder 14, which is below the bottom of the tank. Channel 17 is connected by a circular duct 32 to a drain port 52. Periodically, the settled precipitate particles may be flushed out of the sump 51 through drain port 52 into a waste disposal pipe 53 by opening a waste flow valve. A peripheral flange 42 may be provided at the bottom of pipe 43 for deflecting precipitate particles. A deflector plate 63 above pipe end 46 deflects precipitate particles away from channel 18.

Figure 5:
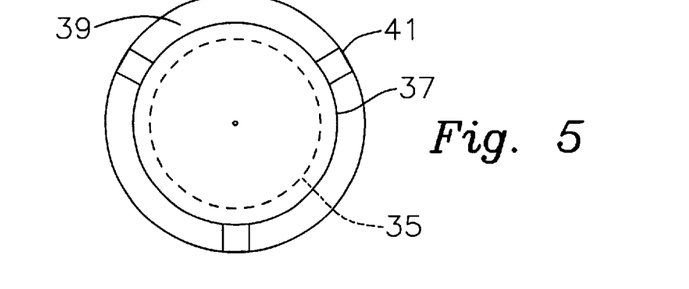
FIG. 5 is a plan view taken along the line 5—5 in FIG. 3.

The remanning port 54 and a circular duct 33 have been shown as closed by a wall 55 inside of the duct. Removal of the wall 55 would connect port 54 and duct 33 to the channel 17 inside of cylinder 14 and would provide to an additional or alternate port on the opposite side of the main body portion 11. By locating the ports 52 and 54 opposite to each other on the main body portion 11, either port can be selected as the waste disposal port. When the port 54 is used a wall, such as the wall 55, may be provided to close the duct 33 and port 52. It is also possible to have no walls closing ducts 32 and 33 so that both ports 52 and 54 will be open and available for use. Having a choice of of the location of the waste outlet ports on opposite sides of tank 1 is necessary when the tank is to be installed in a confined space.

When the time required to treat a liquid is greater than the time the liquid being treated will be in a treatment vessel of a particular size, one or more additional vessels may be connected in series with the first treatment vessel. The additional vessel or vessels can increase the contact time that the liquid being treated is subject to the process parameters, such as pressure, temperature or chemicals, to ensure that complete treatment occurs. By the practice of this invention the use of serially connected treatment vessels permits a liquid treatment process or method to be carried out in tanks that are small enough for a single workman to install in homes with residential sized doors.

Figure 2:
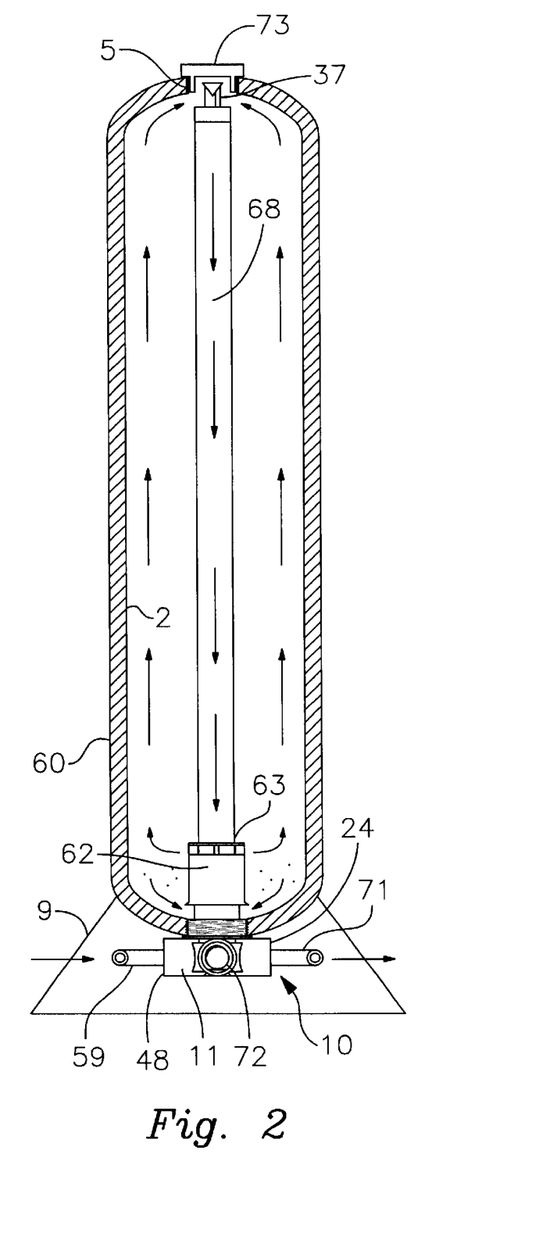
FIG. 2 is a schematic, partially cross sectional side view of another embodiment of liquid treatment apparatus in accord with this invention.
Figure 8:
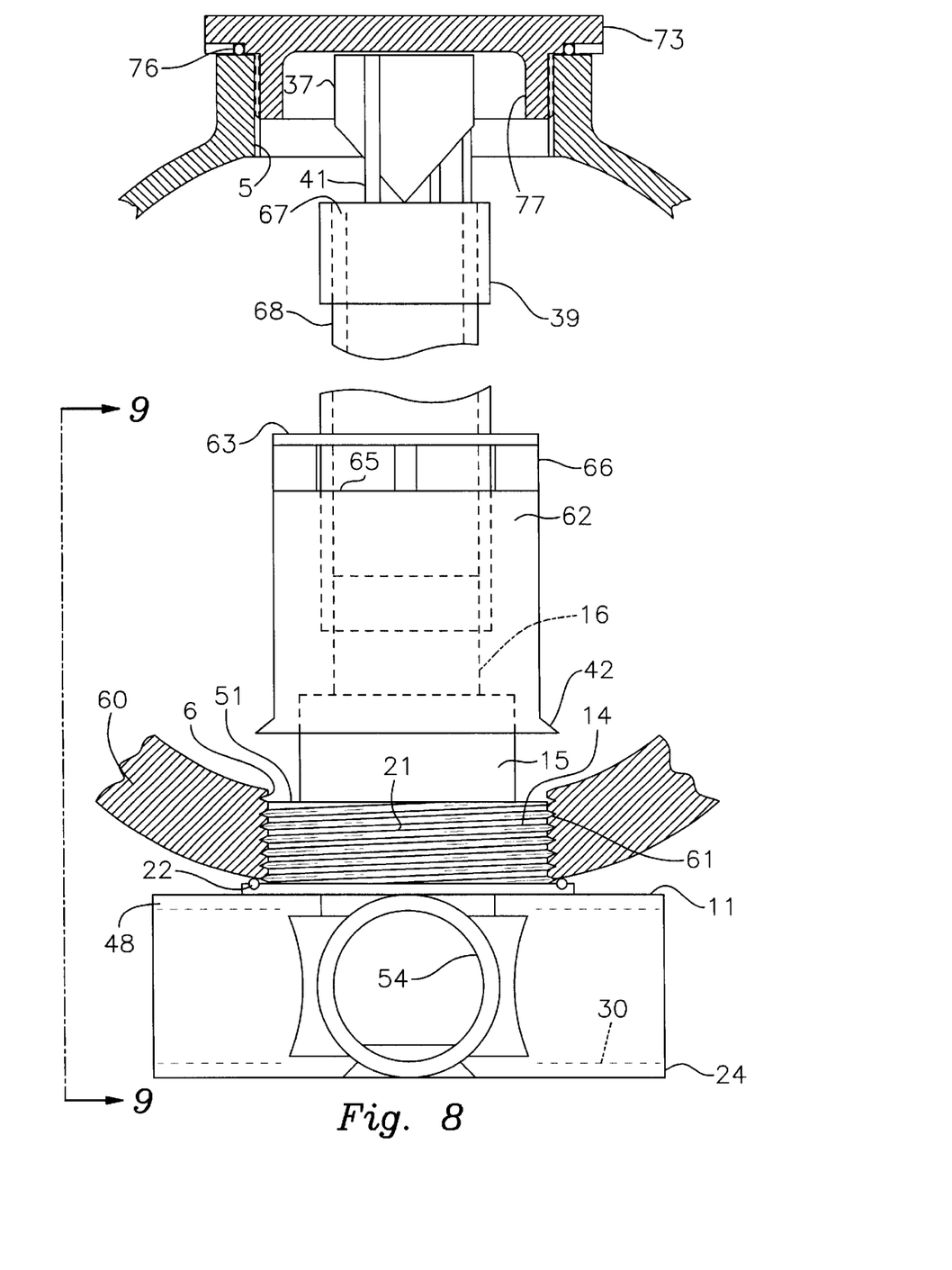
FIG. 8 is an enlarged partially cross sectional, partially broken away, side view of the flow controls from the embodiment of FIG. 2.
Figure 9:
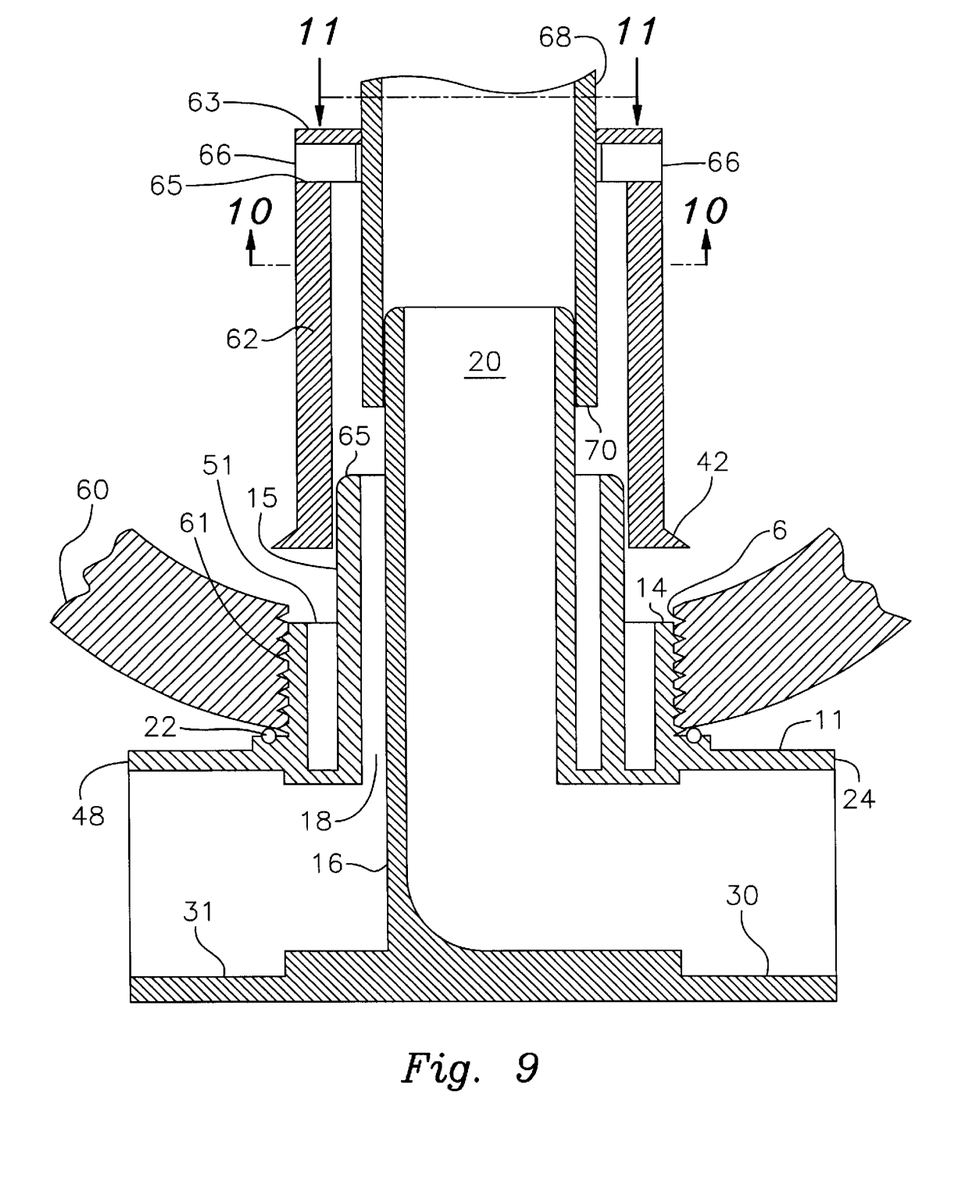
FIG. 9 is an enlarged cross sectional view taken generally along the line 9—9 in FIG. 8.
Figure 10:
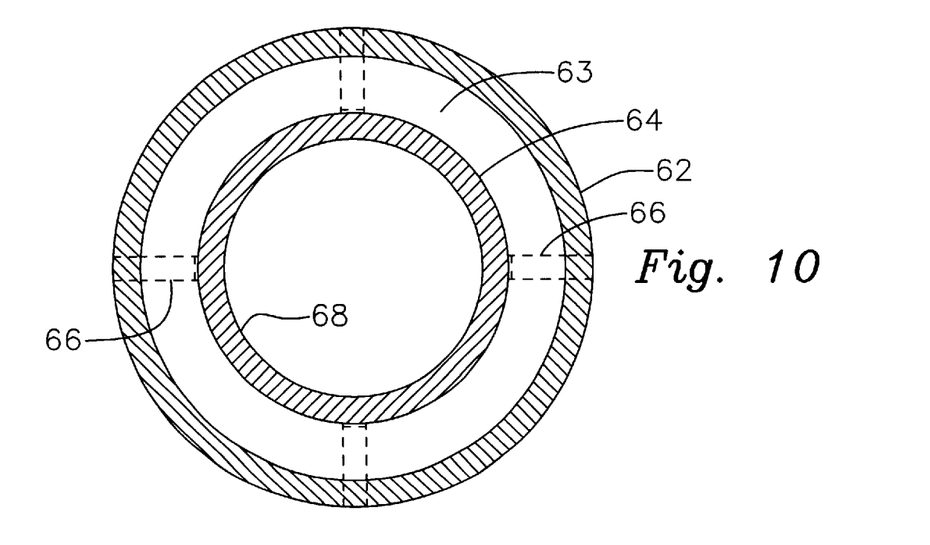
FIG. 10 is a cross sectional view taken along the line 10—10 in FIG. 9.
Figure 11:
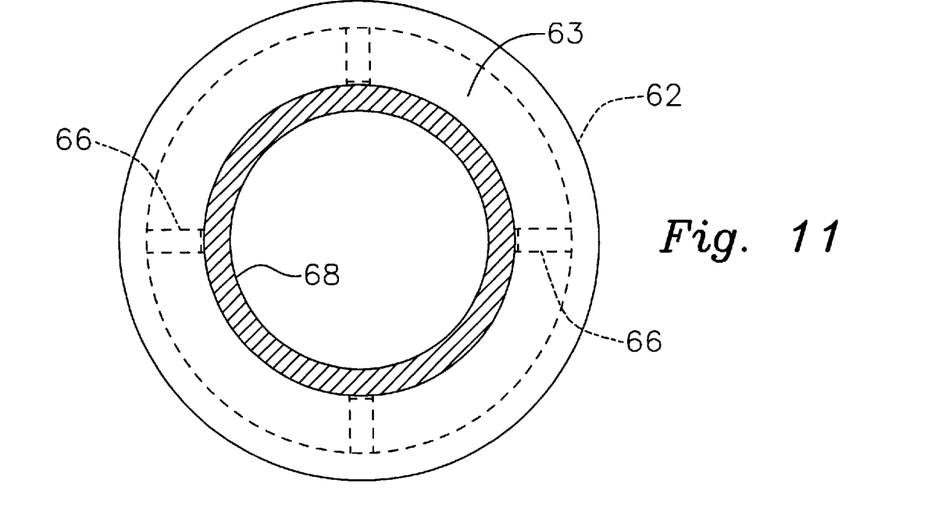
FIG. 11 is a cross sectional view taken along the line 11—11 in FIG. 9.
Figure 12:
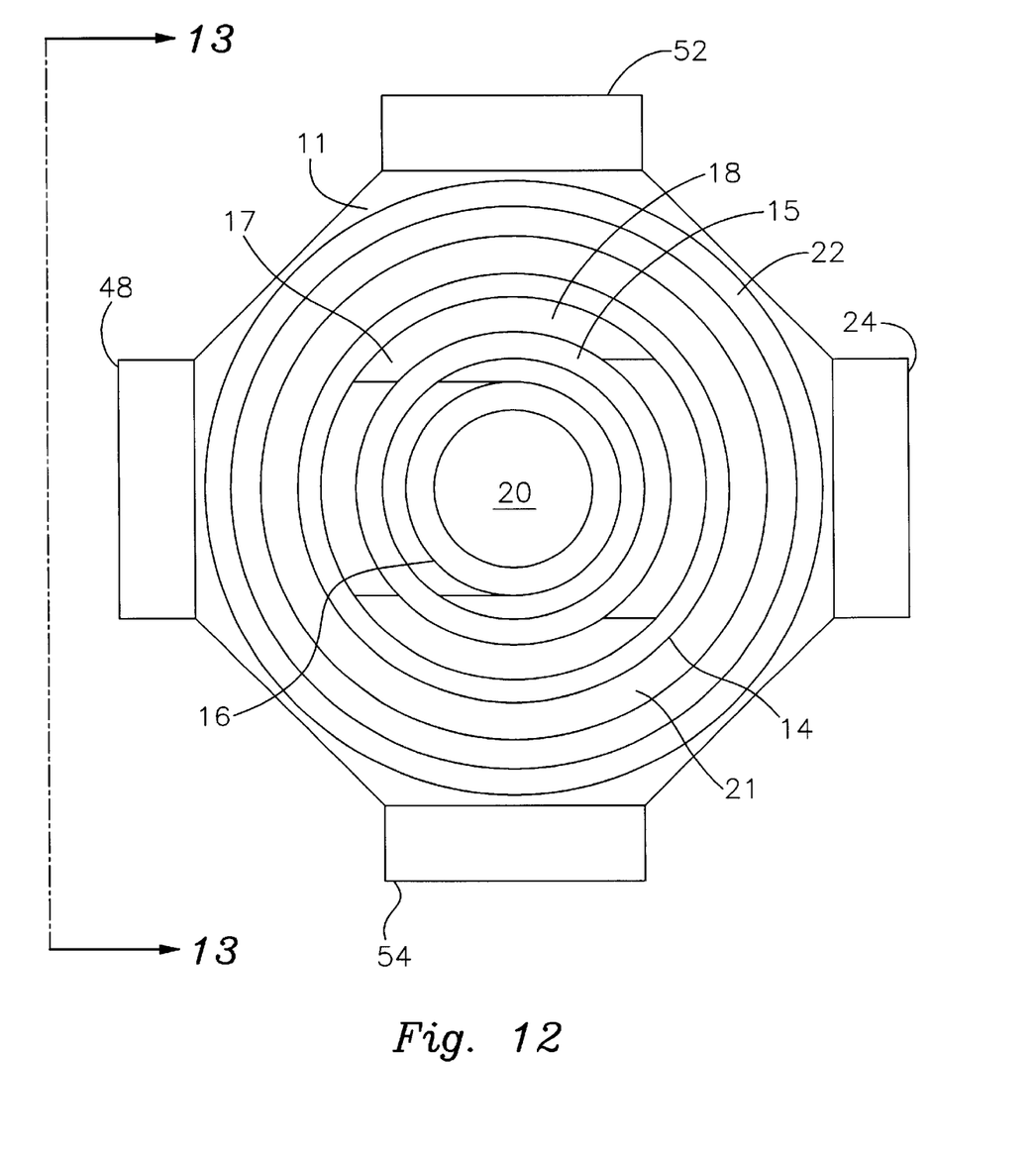
FIG. 12 is an enlarged top plan view of a separator in accord with this invention used in the embodiment of FIG. 2.
Figure 13:
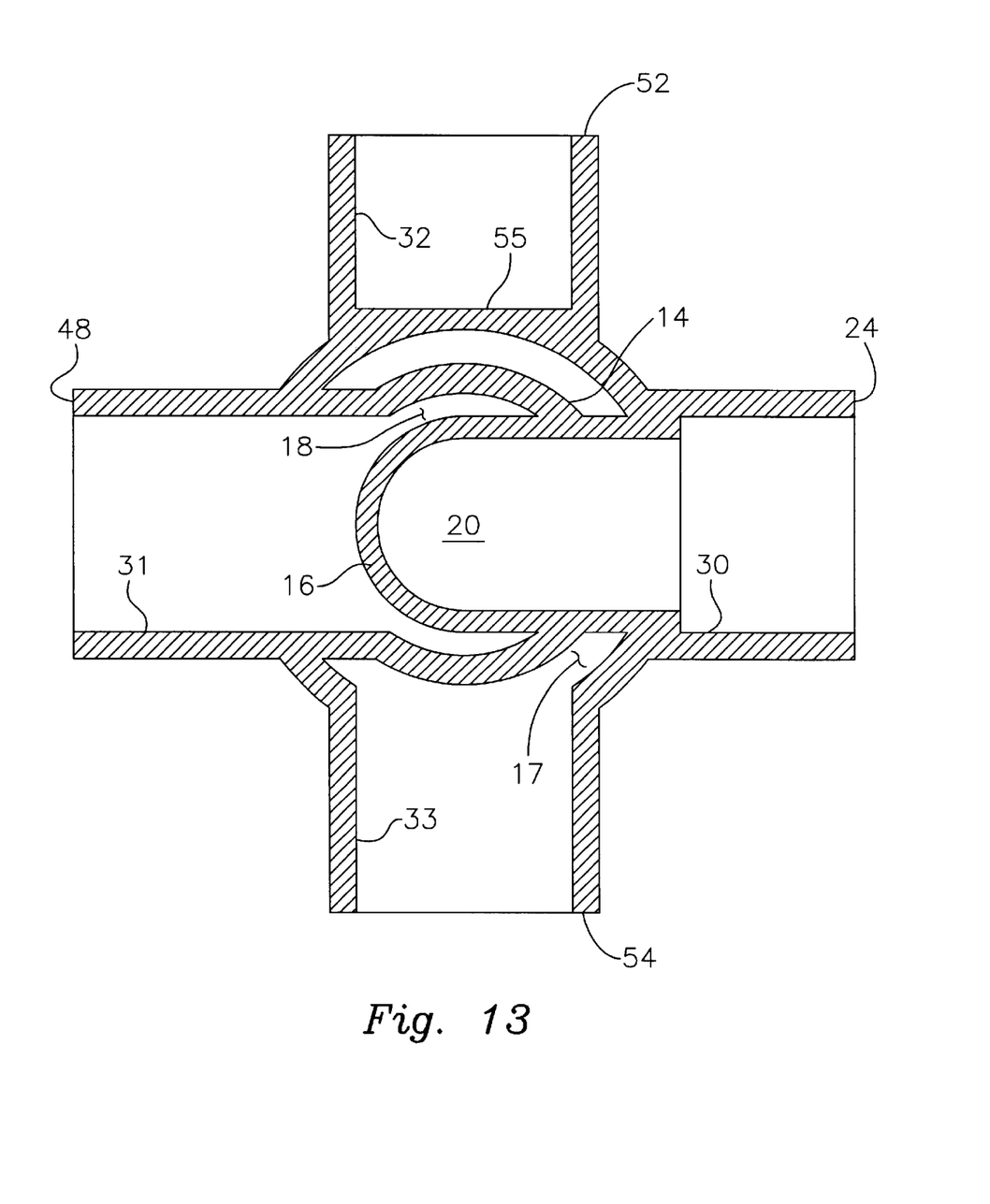
FIG. 13 is a cross sectional view taken generally along the line 13—13 in FIG. 12.

For example, if the minimum detention time required for the method disclosed in my above identified patents can not be achieved in a single residential sized tank, the effluent pipe 50 can be connected to the influent pipe 59 of a second liquid treatment vessel or tank 60 that is identical to the tank 1 in size, shape and location of top and bottom threaded center holes. The tank 60 has a separator 10 identical to that described above, so the same reference numbers are used to identify corresponding parts. Separator 10 is attached to the bottom of tank 60 by threads 21 that mate with the threads in the bottom center hole 61.

The partially treated potable water from tank 1 would enter the center of tank 60 adjacent its bottom through its inlet port 48 in its separator 10. The water would then flow upwardly through the channel 18 in cylinder 15 into a cylindrical distributor pipe 62 that may be identical to the pipe 43 in tank 1. A horizontal circular deflector plate 63 is attached to pipe 62 above its open terminal end 65 by supports 66 that are attached to, and uniformly spaced around, the end 65. The plate 63 disperses the water radially outwardly from adjacent the center of the tank to the inner peripheral surface 2 of the tank.

The deflected dispersed water then flows upwardly across essentially the entire cross sectional area of the tank to the top of the tank 60. The time required for the partially treated water to flow up to the top of tank 60 is sufficient to completely carry out the hydrogen sulfide removal process by precipitating out additional sulfur particles, which fall to the bottom of the tank. The treated water at the top of the tank 60 collects at the center of tank where it enters the open terminal end 67 of a vertically extending cylindrical treated water collection pipe 68 that is centered on the central axis of the tank. The treated water is isolated inside of the pipe 68 from the rest of the water in the tank, and the isolated water flows downwardly through the center of the tank. The bottom end 70 of pipe 68 is connected to cylinder 16. The treated water flows into the channel 20 inside of cylinder 16 and then through the duct 30 to the outlet port 24 of this separator 10. The treated water is discharged for its intended use through an effluent pipe 71.

Since the pipe 68 extends upwardly for most of the length of the tank 60, the pipe is subject to deflection by the hydraulic forces from the water swirling around in the tank. The pipe 68 passes through a circular hole 64 in the center of the deflector plate 63 at a location above the bottom of tank 60. The deflector plate surface at edge of the hole 64 and the supports 66 contact the outside of pipe 68 and help stabilize the pipe. The top of tank 60 is closed by a cap 73 having threads that mate with those in the upper center hole 5. A circular gasket 76 is compressed between the cap and tank to seal the hole 5. The cap is hollowed out to provide a downwardly facing recess or cylinder 77. A deflector 37 that is identical to the deflector 37 described above is attached to the upper terminal end 67 of pipe 68. The deflector 37 extends into the recess 77 so that the cap 73 limits the amount that the pipe 68 can be deflected. The deflector 37 also ensures that the end 67 of pipe 68 is spaced far enough below the surface of cap 73 to prevent obstruction of the entrance into pipe 68.

Precipitated sulfur particles settle to the bottom of tank 60 where they collect in a sump 51 defined by the channel 17 inside of cylinder 14. Periodically, the settled precipitate particles may be flushed out of the sump 51 through channel 33 and drain port 54 into a waste disposal pipe 72 by opening a waste disposal valve. The remanning port 52 and a duct 32 may be closed by a wall 55 as previously described.

It has thus been shown that by the practice of this invention, the separators 10 can be used in different liquid treatment vessels 1 and 60 to control and separate liquid streams flowing in opposite directions. Putting threads on the outside of the shortest cylinder 14 that has the largest diameter permits the separators 10 to be used as bungs for the center holes 6 of the tanks 1 and 60. The use of cylinders 14–16 having different lengths on the separators 10 allows the full liquid flow capacity of the pipes 35, 36, 62 and 68 to be achieved because the wall thickness of the pipes does not obstruct the size of the liquid flow channels 17, 18 and 20.

By locating the coaxial ports 24 and 48 opposite to each other, rotation of the separator 10 in tank 60 by 180 degrees enables the channel 18 that is used as the liquid outlet in tank 1 to be used as the the liquid inlet channel for tank 60; this rotation of separator 10 also enables the channel 20 to be used as the inlet for tank 1 and to be used as the outlet channel for tank 60. Thus the inlet of tank 60 faces the outlet from tank 1. By connecting the coaxial ports 52 and 54 at right angles to the ports 24 and 48, this 180 degree rotation of separator 10 also provides a waste outlet port 54 on the same side of the tank 60 as the waste outlet port 52 on tank 1. This ability to coordinate the location of the ports of different tanks ensures that the space required for a multiple tank liquid treatment system will be reduced or minimized.

The separator 10 and the attached pipes and components may be made from any injection moldable plastic usable for potable water service, such as PVC or ABS. The various attached parts may be solvent welded together into an integral unit.

While the present invention has been described with reference to particular embodiments and methods, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

I claim:

1. An integral bung, solids collecting sump and liquid flow separator for attachment to the bottom of a liquid treatment vessel, comprising, a main body portion, a plurality of cylinders protruding perpendicularly upwardly from the center of said main body portion, said cylinders being concentric and having different diameters, said cylinders being spaced apart so as to define an annular liquid flow channel inside of one of said cylinders that separates said one cylinder from another of said cylinders, there being a plurality of externally opening liquid flow ports in said main body portion, a plurality of ducts connecting said ports to said cylinders for flowing liquid through said liquid flow channel, said cylinders having different lengths and the cylinder with the smallest diameter having the longest length, the cylinder with the largest diameter having the shortest length, said cylinder with the largest diameter having threads on its outer surface for mating with threads in said liquid treatment vessel for attaching said main body portion as a bung in the bottom of said liquid treatment vessel that provides a settled solids collecting sump within said cylinder with the largest diameter in the bottom of said vessel, and said ports and ducts being located below said threads on said cylinder with the largest diameter so as to position said ports below said settled solids collecting sump on the outside of said liquid treatment vessel.

2. The integral bung, solids collecting sump and liquid flow separator for attachment to the bottom of a liquid treatment vessel defined in claim 1, wherein at least three cylinders extend perpendicularly upwardly from the center of said main body portion.

3. The integral bung, solids collecting sump and liquid flow separator for attachment to the bottom of a liquid treatment vessel defined in claim 1, further comprising a pair of coaxial ports located on opposite sides of said main body portion.

4. The integral bung, solids collecting sump and liquid flow separator for attachment to the bottom of a liquid treatment vessel defined in claim 1, further comprising two pair of coaxial ports located on opposite sides of said main body portion, and the axis of one pair of the coaxial ports being perpendicular to the axis of the other pair of coaxial ports.

5. The integral bung, solids collecting sump and liquid flow separator for attachment to the bottom of a liquid treatment vessel defined in claim 1, further comprising a removable wall blocking one of said ducts.

6. Liquid treatment apparatus comprising, a generally cylindrical tank having a threaded circular opening centered in its bottom in which solids are precipitated and settled toward said circular opening; an integral bung, solids collecting sump and liquid flow separator for controlling liquid flow within said tank having a main body portion having a plurality of cylinders protruding perpendicularly upwardly therefrom, said cylinders being concentric and having different diameters, the cylinder with the largest diameter having the shortest length and the cylinder with the smallest diameter having the longest length, said cylinder with the largest diameter having external threads that mate with the threads in said circular opening for attaching said main body portion as a bung to the center of the bottom of said tank so as to provide a sump for collecting settled solids within said cylinder with the largest diameter at the bottom of said tank, said cylinders being spaced apart so as to define annular liquid flow channels inside of some of said cylinders, said channels separating such cylinders from each other, there being a plurality of externally opening liquid flow ports in said main body portion, said ports being below said sump and outside of the bottom of said tank, said ports being connected by ducts to said spaced cylinders for flowing liquid through said liquid flow channels, a first of said spaced cylinders being attached to a first liquid flow pipe that carries liquid flowing through a channel defined inside of said first cylinder in a first direction, and a second of said spaced cylinders being attached to a second liquid flow pipe that carries liquid flowing through a channel defined inside of said second cylinder in a direction opposite to said first direction.

7. The liquid treatment apparatus defined in claim 6, wherein, said cylinder with the largest diameter has an upper end within said tank that is closely adjacent the bottom of said tank.

8. The liquid treatment apparatus defined in claim 7, wherein, said cylinder with the largest diameter has an upper end that terminates within said threaded circular opening.

9. The liquid treatment apparatus defined in claim 6 further comprising a pair of coaxial ports located on opposite sides of said main body portion.

10. The liquid treatment apparatus defined in claim 6 further comprising two pair of coaxial ports located on opposite sides of said main body portion, and the axis of one pair of the coaxial ports being perpendicular to the axis of the other pair of coaxial ports.

11. The liquid treatment apparatus defined in claim 6 further comprising a removable wall blocking one of said ducts.

12. The liquid treatment apparatus defined in claim 7 wherein said first liquid flow pipe terminates near the bottom of said tank and said second liquid flow pipe terminates closer to the top of said tank than to the bottom of said tank.

13. The liquid treatment apparatus defined in claim 12 wherein said second liquid flow pipe terminates adjacent the top of said tank.

14. The liquid treatment apparatus defined in claim 13, wherein said cylindrical tank has a threaded circular opening centered in its top, a threaded cap sealing said circular opening, there being a downwardly facing recess in said cap, and said second liquid flow pipe has an end extending into said recess for limiting movement of aid second liquid flow pipe.

15. The liquid treatment apparatus defined in claim 13 wherein said second liquid flow pipe is connected to the cylinder having the smallest diameter.

16. The liquid treatment apparatus defined in claim 7 wherein there are at least three cylinders protruding perpendicularly from the center of said main body portion.

17. Liquid treatment apparatus comprising, a tank having a threaded circular opening in its bottom in which solids are settled toward said bottom, a liquid flow separator for attachment into the bottom of said tank comprising a main body portion, a plurality of spaced cylinders protruding upwardly from the center of said main body portion, said cylinders being concentric and having different diameters, said cylinders being spaced apart so as to define annular liquid flow channels inside of said cylinders that separate said cylinders from each other, there being a plurality of externally opening liquid flow ports in said main body portion, said ports being connected by ducts to said cylinders for flowing liquid through said liquid flow channels, said cylinders having different lengths and the cylinder with the smallest diameter having the longest length, the cylinder with the largest diameter having the shortest length, said cylinder with the largest diameter having threads on its outer surface mating with the threads in said circular opening in the bottom of said tank so as to attach said main body portion as a bung in the bottom of said tank that provides a solids collecting sump at the bottom of said tank within said cylinder with the largest diameter, said ports being located below said threads for positioning said ports outside of said tank below said solids collecting sump, a first of said spaced cylinders being attached to a first liquid flow pipe that carries liquid flowing through a channel defined inside of said first cylinder in a first direction, and a second of said spaced cylinders being attached to a second liquid flow pipe that carries liquid flowing through a channel defined inside of said second cylinder in a direction different from said first direction.

18. The liquid treatment apparatus defined in claim 17 wherein at least three cylinders extend perpendicularly upwardly from the center of said main body portion.

19. The liquid treatment apparatus defined in claim 17 wherein, said cylinder with the largest diameter has an upper end within said tank that is adjacent the bottom of said tank.

20. The liquid treatment apparatus defined in claim 19 wherein said upper end of said cylinder with the largest diameter terminates within said threaded circular opening below the interior bottom surface of said tank.

21. The liquid treatment apparatus defined in claim 17 further comprising a pair of coaxial ports located on opposite sides of said main body portion.

22. The liquid treatment apparatus defined in claim 17 further comprising two pair of coaxial ports located on opposite sides of said main body portion, and the axis of one pair of the coaxial ports being perpendicular to the axis of the other pair of coaxial ports.

23. The liquid treatment apparatus defined in claim 17 further comprising a removable wall blocking one of said ducts.

* * * * *